June 3, 1930. J. BLAEKER ET AL 1,760,974
DUAL WEAR COMPENSATING PISTON PACKING RING
Filed July 2, 1928 2 Sheets-Sheet 1

JOSEPH BLAEKER
FREDERICK A. SMITH
INVENTORS

BY *Joseph Blaeker*
ATTORNEY

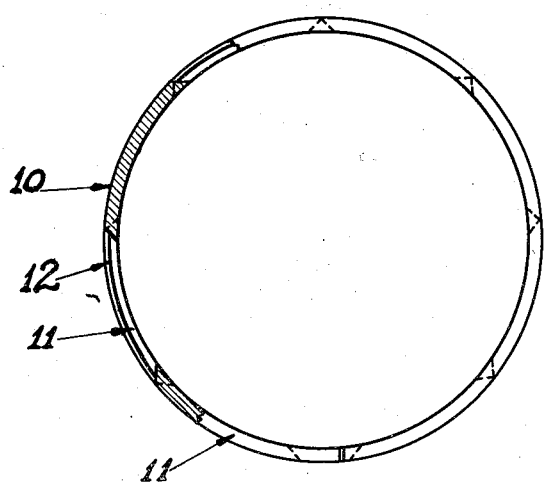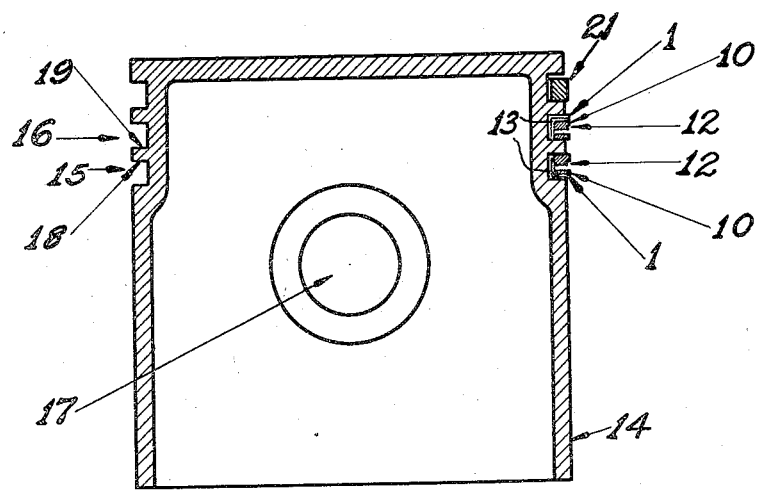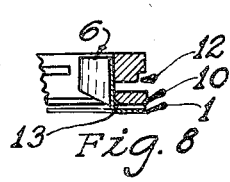

UNITED STATES PATENT OFFICE

JOSEPH BLAEKER AND FREDERICK A. SMITH, OF NEW YORK, N. Y.

DUAL WEAR-COMPENSATING PISTON PACKING RING

Application filed July 2, 1928. Serial No. 289,776.

This invention relates to piston packing rings used for preventing leakage past the pistons of internal combustion engines and all kinds of reciprocating engines in general.

The main object of this invention is to provide an axially non-resilient one-piece piston packing ring and a one-piece wear-compensating spring, the combination of which will make it possible to maintain a permanently tight junction between the piston and cylinder wall under all operating conditions.

Another object of this invention is to provide a one-piece piston packing ring and a one-piece dual wear-compensating spring, both being insertable into a groove of the piston and the combination of which will operate in the groove without any side clearance and will exert an axial pressure against the side walls of the groove, and which will also exert a radial pressure against the walls of the cylinder.

Another object of this invention is to provide a dual wear-compensating piston packing ring which will prevent loss of compression and leakage of oil, and which will eliminate the noises caused by the hammering of loosely fitting rings in worn grooves and the noises caused by piston slap.

It is common practice to allow a clearance space between the axial faces of the piston ring and the piston groove so as to enable the piston ring to move freely in a radial direction. To maintain a piston ring in a groove without this side clearance space is rendered difficult by reason of the high temperature in an internal combustion engine and the distortion of the piston groove surfaces by the expansion of the head of the piston under the heat, and a piston ring when used under such operating conditions must have extreme resilient properties.

When the piston groove and piston ring are new, the clearance space may be very small, but the constant hammering due to the arresting of the inertia by the sudden reversal of the moving parts wears and widens the ring groove and the longitudinal movement of the ring within the worn and widened groove causes the ring to function as an oil pump. The problem is that of finding means which will fill the worn groove and compensate for unavoidable wear and that the means must have a service life as long as the life of the ordinary piston ring or as long as the life of the piston itself.

We are aware that attempts have been made to produce a one-piece piston ring to operate without any side clearance, and this has been done by means of an oversize and axially compressible ring having one or more series of staggered through-slots, the ring being originally of a greater width than the groove and requires compression before insertion in the groove so that the ring reacts and fills the groove.

This arrangement of staggered cast iron beams fabricated into an oversized and axially flexing piston ring structure lasts only a short time when subjected to the repetition of lateral flexure in a hot engine cylinder. The cast iron beams lose their resiliency, and the ring loses its side reacting properties and cannot permanently continue to seal the side walls of the groove.

Only a properly tempered steel spring can be made to possess permanent flexing properties under operating conditions in an engine cylinder, and in our solution of the problem we use a resilient wear-compensating spring to function in the piston groove in combination with an axially non-resilient one-piece piston ring.

The combined piston packing ring embodying this invention comprises a piston ring member and a spring member of novel construction, both being inserted in a piston ring groove without any side clearance, and the spring member has as its duty the dual functions of pressing the piston ring axially against a sidewall of the groove so as to compensate for wear of the sides of the groove, and the faces of the ring and also to press the piston ring radially against the cylinder wall and to shape the ring so as to conform with the out-of-round cylinder walls and thereby compensate for the wear that takes place between the ring and the cylinder walls.

With the various objects in view the invention will be hereinafter more particularly described, and the combination and arrangement of parts will be shown in the accompanying drawings and pointed out in the claims which form part of this specification. It being understood that various changes in the form, proportion, size and minor details of construction within the scope of the claims, may be resorted to without departing from the spirit or sacrificing any of the advantages of the invention.

Reference will now be had to the drawings, wherein like numerals of reference designate corresponding parts throughout the several views, in which:

Figure 5 is a plan view of a piston packing ring constructed in accordance with this invention, the ring being partly in section.

Figure 6 is a side elevation of the piston packing ring.

Figure 7 is a section of a piston showing two sections of dual wear-compensating piston packing rings installed in operating position.

Figure 8 is an enlarged fragmentary section of one of the rings and springs.

Figure 1:
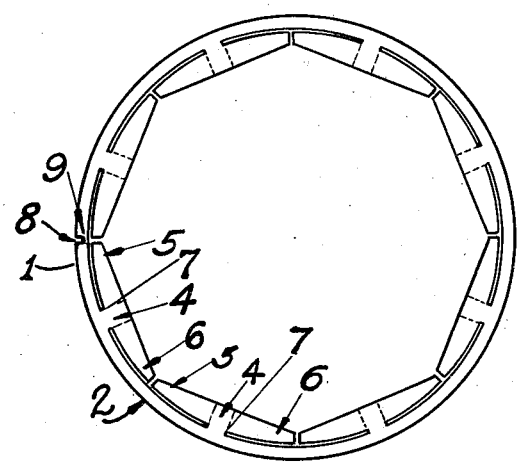
Figure 1 is a plan view of a flat spring-steel blank from which the spring member is made and shows an annular spring and a plurality of integral spring arms and cantilever arms.

The dual wear-compensating spring 1 is made out of a blank of flat, thin spring-steel in the form of an annular spring 2, the annular surface having pressed therein a series of undulations or waves 3, 3, and these undulations make the annular surface resilient so that it will rebound, if compressed. A plurality of equally spaced spring arms 4, 4 are located at the lower level of the waves and at the inner circumference of the annular spring 2, and preferably extend upwardly at an angle of about eighty-five degrees. Each spring arm carries at its free end two cantilever arms 5, 6, one arm on each side and both cantilever arms are at the same elevation. The resulting fabrication being such that the dual wear-compensating spring readily fits into a piston groove together with an axially non-resilient piston ring, the spring contacting with one axial face of the ring.

Figures 2, 3:
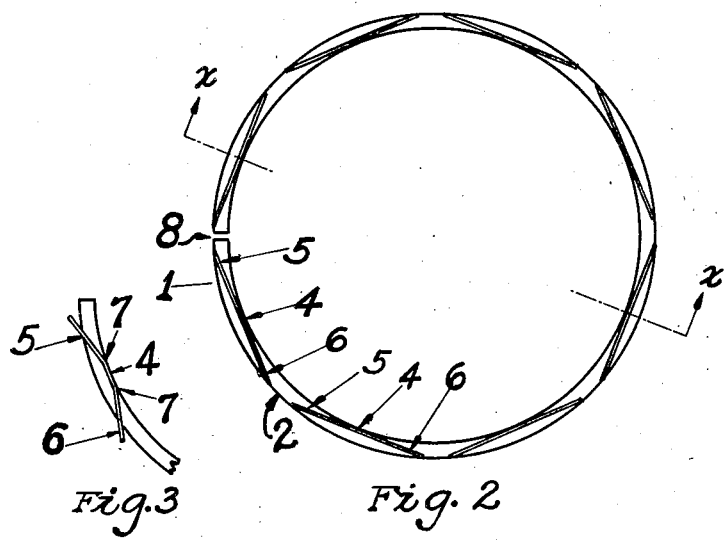
Figure 2 is a plan view of a dual wear-compensating spring constructed in accordance with this invention, and shows the spring arms and cantilever arms in angular position to the annular spring.
Figure 3 is a fragmentary segment of the dual wear-compensating spring, showing one spring arm and two integral cantilever arms in angular position to each other and to the annular spring.
Figure 4:
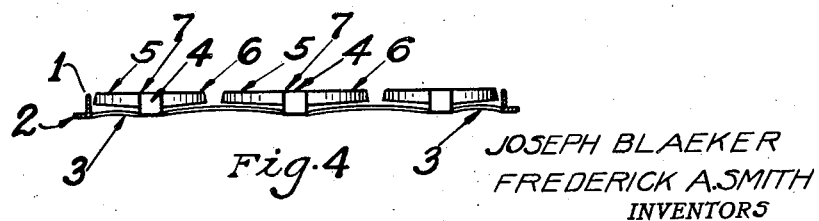
Figure 4 is a section of the dual wear-compensating spring member, the section being taken as on line x—x in Figure 2.

As shown in Figure 3, the spring arm 4, and the cantilever arms 5, 6 are integral but are distinct from each other and may be bent at an angle to each other, as best shown at 7, 7. One function of the spring arms 4, 4, is to centralize the annular spring 2 around the piston and to prevent the outer circumferential edge of the annular spring from extending beyond the piston circumference, and thus scoring or damaging the cylinders of the motor.

Another function of each spring arm 4 is to carry and maintain in position two cantilever arms or beam members 5, 6.

The preferred eighty-five degree inclination of the spring arms 4, 4 serves to take care of the variable depths of piston grooves met in practice, as the circumference formed by these spring arms when bent to an eighty-five degree angle is small enough to contact with the longitudinal wall of deep grooves, and in case of shallow grooves the spring arms bend outwardly and approach a ninety degree angle. It is thus seen that the dual wear-compensating spring flexes and exerts pressure in three directions, axially against an axial face of the piston ring, radially against the cylinder wall, and on a substantially eighty-five degree angle against the longitudinal wall of the groove in the piston.

The outer and inner circumferences of the annular spring are concentric and the annular surface is split at one point of the circumference and a wide cut 8 is made so as to facilitate the installation and removal of the spring from piston grooves. A small portion of the metal is left intact, as shown at 9, so as to prevent warping of the annular spring while being hardened. This portion 9 is removed after tempering.

It is to be noted that the spring structure shown in Figure 2 represents the first shop operation after the plurality of spring arms have been bent upwards and shows the arms 5, 4 and 6 in a straight line, while the spring structure shown in Figure 3 represents the final shop operation after the cantilever arms 5 and 6 have been bent and placed at an angle to the spring arm 4.

The piston ring 10 is ventilated with a number of slots 11, 11, in which there collects the oil scraped from the cylinder walls. The slots are arranged in two circumferential series in parallel planes in alternately disposed positions, and extend through the ring from the outer to the inner circumference, the centre line of each slot of one plane being located substantially in the center between two slots of the other plane and the end walls of each slot in one plane stop substantially at the end walls of the two adjacent slots in the other plane. This arrangement of the end walls forms solid connecting sections which separate the two series of slots. The end walls of the slots at the point 20 where the ring is split are spaced apart from each other a slight distance and stop short of the respective parallel sides of the step junction.

A circumferential groove 12 is cut in the cylinder wall engaging face of the rings. This groove is located between the adjacent lateral walls of the parallel slots and is outside the regional zones of the two series of parallel slots, and does not overlap any of the slots. This groove allows the oil in any slot of one plane to agitate in a perpendicular direction to the slot and mix with the oil in the adjacent parallel slots of the other plane.

As shown in Figures 7 and 8, one of the inner circumferential edges 13 of the ring is beveled. This bevel prevents contact between the inner circumferential edge of the ring and the offset spring arms, contact being desirable only at the inner face of the piston ring.

These multi-slotted rings are designed to trap the oil scraped from the cylinder walls and to hold the oil within the slots and not to allow the oil to move upwards to the combustion chamber.

The piston 14 may be one of any number of makes and has therein any desired number of ring grooves, generally limited to three. Two dual wear-compensating rings 10, 10 of our design are placed in the two grooves 15, 16 first above the wrist pin hole 17.

The piston ring 21 in the top groove may be any kind of concentric snap ring, or one of our multi-slotted rings may be used.

The design as illustrated in Figure 7 is such that the wear-compensating spring 1, in the lower groove 15, presses the piston ring up and holds it level with the upper lateral face 18 of the groove and also acts as a radial piston ring expander. The wear-compensating spring 1 in the upper groove 16 acts as a radial expander and presses the piston ring down and holds it level with the lower lateral face 19 of the groove. The spring in the upper groove 16 may be placed so that it will press the piston ring up and hold it level with the upper lateral face of the groove, and will duplicate the action of the spring in the lower groove; there will then be two springs pressing upwards. Each spring thus performs the dual functions as a lateral levelizer and radial expander. A predetermined pressure is developed between the lateral faces of the ring and spring and the side walls of the groove and this pressure is variable and is limited so as to permit the free radial movement of the ring within the groove, without the usual side clearance.

When the piston ring and spring are in the piston groove, each cantilever arm is pressed inwardly and the spring arm is pressed inwardly till it comes in contact with the longitudinal wall of the groove. Each cantilever arm is free to flex individually and also in conjunction with all the other cantilever arms as a circular unit and each cantilever arm exerts a radial pressure against the inner circumferential wall of the piston ring.

When a dual wear-compensating piston packing ring is installed in a groove of a piston and operates for any length of time in a reciprocating engine cylinder, there is bound to be wear on the ring and on the side walls of the groove, but the spring member or levelizer and expander exerts a wear-compensating lateral and radial pressure regardless of wear and automatically increases the over-all dimensions between the lateral bearing surfaces of the piston ring and spring and conforms to the larger width of the worn groove.

We have demonstrated by actual practice that piston rings embodying the features of this invention can operate successfully under working conditions and that they conform immediately to any condition of worn and out-of-round cylinders, and that these dual wear-compensating piston packing rings and double-acting springs automatically compensate for wear of the ring and piston groove, and centralize the ring and eliminate piston slap and the annoyances caused by the leakage of oil to the combustion chamber and the leakage of compressed gases from the combustion chamber.

We believe ourselves to be the first to make a dual wear-compensating piston packing ring, comprising a one-piece axially non-resilient piston ring and a co-operating one-piece double-acting spring, which contacts with one axial face of the ring and with the inner circumferential face of the ring, and which combination can perform the dual functions of compensating for axial wear as well as for radial wear and, therefore, intend to claim our invention in the broadest manner permitted by law.

We claim:—

1. A combined dual wear-compensating piston packing ring comprising an axially non-resilient piston ring member and a co-operating thin annular undulated or wavy and axially resilient spring member, said spring member having integral therewith a plurality of spaced angularly extending spring arms around the inner circumference, and said spring arms being located at the lower level of the waves.

2. A combined dual wear-compensating piston packing ring comprising an axially non-resilient piston ring member and a co-operating axially resilient spring member, said spring member having an annular spring surface and a plurality of integral spring arms spaced equi-distantly around the inner circumference, extending upwardly and disposed at an angle with the annular surface.

3. A combined dual wear-compensating piston packing ring comprising an axially non-resilient piston ring member and a co-operating thin annular axially resilient spring member, said spring member having integral therewith a plurality of equally spaced angularly extending spring arms around the inner circumference, each arm being free to flex individually and also in conjunction with all the other spring arms as a circular unit.

4. A combined dual wear-compensating piston packing ring comprising an axially non-resilient piston ring member and a co-operating thin annular axially resilient spring member, said spring member having integral therewith a plurality of angularly extending spring arms around the inner circumference, each arm being free to flex individually and also in conjunction with all the other spring arms as a circular unit and said annular surface of the spring being provided with a series of undulations.

5. A combined dual wear-compensating piston packing ring comprising a one-piece piston ring member and a one-piece co-operating spring member having the dual properties of exerting a radial as well as an axial pressure against the piston ring member under operating conditions in a piston ring groove, said co-operating spring member comprising an annular spring having integral therewith a plurality of spring arms equally spaced around the inner circumference and angularly disposed to the annular spring, each spring arm carrying two integral cantilever arms and said annular spring being also provided with a series of equally spaced undulations, the cantilever arms serving to flex in a radial direction and the undulated annular spring serving to flex laterally and both the radial and lateral flexure functions being dependent upon and co-acting with the spring arms.

6. The combination of a one-piece piston ring and a dual wear-compensating means, both arranged to fit snugly within the groove walls of a piston, said wear-compensating means comprising a yieldable annular ring set against a wall of said groove and adapted to automatically take up and compensate for axial wear of said piston ring and a plurality of offset angularly disposed spring members inside of said annular ring and adapted to centralize said piston ring and automatically take up and compensate for radial wear of said piston ring.

7. The combination with the body member of a piston formed with a circumferential groove, of a one-piece piston packing ring member and of a one-piece annular and undulated spring member seated within said groove, the combined heights of the one-piece piston ring and of the annular spring member after undulating being normally greater than the width of the groove so as to require compression of the annular undulated spring member before insertion in the groove and resulting in an axial pressure to be exerted upon a lateral face of the one-piece piston ring and on the lateral walls of the groove, and spring means provided to centralize the piston ring within the piston groove, said spring means being integral with the one-piece annular spring member.

8. In a dual wear-compensating device for piston rings, an annular member made of a blank of flat, thin spring steel having pressed therein a series of undulations or waves, thereby making the surface resilient, a plurality of equally spaced integral spring arms located at the inner circumference of said annular member and angularly disposed to said annular member, each spring arm carries two cantilever arms functioning so as to force the piston ring outwardly, and said spring arms and cantilever arms placed in angular position to each other.

9. In combination, an axially non-resilient piston ring and an annular axially resilient leveling and centering means for said piston ring positioned within a groove of a piston, said leveling means having non-skew corrugations in two parallel planes, the corrugations extending and contacting on one side against an axial face of the ring and on the other side against an axial face of the groove and exerting a non-oblique pressure thereon, and the said centering means comprising a plurality of associated integral springs placed in angular position with the annular leveling means and only at the inner circumference of the annular leveling means.

10. In combination, a pair of packing rings in a groove of a piston, one of said rings being axially non-compressible, and the other of said rings being corrugated and axially compressible, and the said corrugations contact with the axially non-compressible ring and exert a non-oblique pressure thereon and force said ring against an axial face of the piston groove, and associated spring means integral with said corrugated ring for centering said piston rings, the said centering spring means comprising a plurality of T shaped spring arms spaced around the inner circumference of the corrugated ring.

11. In an internal combustion engine, the combination with a piston having a ring groove therein, of a single piece transversely split axially non-compressible ring having an axial thickness less than the width of the groove and an axially compressible transversely split and corrugated spring ring within said groove, the combined heights of both rings being normally greater than the width of the groove and requiring compression of the corrugated ring before insertion in the groove together with the axially non-compressible ring and resulting in a predetermined axial pressure to be exerted upon a lateral face of the axially non-compressible ring and on the lateral walls of the groove, and the said corrugated ring being provided with a plurality of substantially T shaped spring arms spaced around the inner circumference and serving to centralize the rings and piston under operating conditions in the engine cylinder, the said spring arms being connected with the corrugated ring but disconnected from each other so as to maintain the annular oil space within said ring groove as one continuous compartment.

JOSEPH BLAEKER.
FREDERICK A. SMITH.